(12) United States Patent
Kanbe et al.

(10) Patent No.: US 7,005,202 B2
(45) Date of Patent: *Feb. 28, 2006

(54) MAGNETIC RECORDING MEDIUM AND MAGNETIC RECORDING APPARATUS

(75) Inventors: Tetsuya Kanbe, Odawara (JP); Yotsuo Yahisa, Odawara (JP); Yoshibumi Matsuda, Hiratsuka (JP); Jo Inagaki, Odawara (JP); Koji Sakamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/631,768

(22) Filed: Aug. 1, 2003

(65) Prior Publication Data

US 2004/0028950 A1 Feb. 12, 2004

Related U.S. Application Data

(63) Continuation of application No. 09/888,523, filed on Jun. 26, 2001, now Pat. No. 6,623,874.

(30) Foreign Application Priority Data

Oct. 6, 2000 (JP) ............... 2000-313120
Dec. 11, 2000 (JP) ............... 2000-381692

(51) Int. Cl.
G11B 5/66 (2006.01)
G11B 5/70 (2006.01)

(52) U.S. Cl. .................................... 428/831.2
(58) Field of Classification Search .......... 428/694 TS, 428/694 TM, 611, 667, 668, 900, 831.2, 428/827
See application file for complete search history.

(56) References Cited

U.S. PATENT DOCUMENTS

| 5,820,963 A | 10/1998 | Lu et al. ............... 428/65.3 |
| 5,922,456 A | 7/1999 | Tanahashi et al. ........ 428/332 |
| 6,333,840 B1 | 12/2001 | Yoda et al. ............... 360/313 |

(Continued)

FOREIGN PATENT DOCUMENTS

| JP | 4-188427 | 7/1992 |
| JP | 10-79113 | 3/1998 |
| JP | 10-233014 | 9/1998 |
| JP | 2000-113445 | 4/2000 |

OTHER PUBLICATIONS

Y. Matsuda et al, "Reduction of Co-Cr-Pt Media Noise by Addition of Ti to C Underlayer", Journal of Applied Physics. vol. 79, No. 8, Apr. 1996, pp. 5351-5353.

(Continued)

*Primary Examiner*—Holly Rickman
(74) *Attorney, Agent, or Firm*—Mattingly, Stanger, Malur & Brundidge, P.C.

(57) ABSTRACT

The longitudinal magnetic recording medium includes a non-magnetic substrate, a first underlayer having at least one of an amorphous structure and a fine crystal structure formed on the non-magnetic substrate, a second underlayer having a body-centered cubic structure formed on the first underlayer, a third underlayer having a hexagonal closed packed structure formed on the second underlayer, and a magnetic layer having the hexagonal closed packed structure formed on the third underlayer, wherein the third underlayer is composed of an alloy containing Co and Ru.

6 Claims, 6 Drawing Sheets

U.S. PATENT DOCUMENTS 6,383,667 B1   5/2002   Futamoto et al. ...... 428/694 TS
6,432,563 B1   8/2002   Zou et al. .............. 428/694 TS

OTHER PUBLICATIONS

K. Yamanaka et al, "Magnetic Viscosity of Oriented Barium Ferrite Media", Journal of Magnetism and Magnetic Materials, vol. 127, 1993, pp. 233-240.

L. Lee et al, NiAl Underlayers for CoCrTa Magnetic Thin Films, IEEE Transactions on Magnetics, vol. 30, No. 6, Nov. 1994, pp. 3951-3953.

L. Lee et al, "MgO Seed Layers for CoCrPt/Cr Longitudinal Magnetic Recordin Media", Applied Physics Letters, vol. 67, No. 24, Dec. 1995, pp. 3638-3640.

X-RAY DIFFRACTION SPECTRUM OF MEDIUM USING
Co-40at%Ru AS THIRD UNDERLAYER AND COMPARISON

FIG. 2A

X-RAY DIFFRACTION SPECTRUM OF Ni-40at%Cr-8at%Zr ALLOY SINGLE FILM AS FIRST UNDERLAYER

FIG. 2B

X-RAY DIFFRACTION SPECTRUM OF MEDIUM USING Ni-40at%Cr-8at%Zr ALLOY AS FIRST UNDERLAYER

MAGNETIC RECORDING MEDIUM AND MAGNETIC RECORDING APPARATUS

This application is a continuation of Ser. No. 09/888,523 filed Jun. 26, 2001 now U.S. Pat. No. 6,623,874.

BACKGROUND OF THE INVENTION

1. Field of the Invention

The present invention relates to a longitudinal magnetic recording medium with noise suppressed and stability improved, and more particularly to a magnetic recording apparatus having a high recording density which is arranged to use the longitudinal magnetic recording medium.

2. Description of the Related Art

In recent days, a request has been increasingly elevated for enlarging a volume of a magnetic disk drive. Accordingly, the magnetic head has been requested to have a far higher efficiency and the recording medium has been requested to have a far higher coercivity and lower noise.

The magnetic head is used of a composite head that includes both an inductive head for recording data and a spin-valve type head for reading back data. The spin-valve type head is a read-back head that is composed of a magnetoresistive sensor having a plurality of conductive magnetic layers whose directions of magnetization are relatively changed by the outside magnetic field so that a large resistance change may be brought about and conductive non-magnetic layers located between the adjacent conductive magnetic layers.

The magnetic recording medium is composed of a first underlayer called a seed layer formed on a substrate, a second underlayer composed of a Cr alloy having a body-centered cubic structure (bcc structure), a magnetic layer composed of a Co alloy having a hexagonal closed packed structure, and a carbon protective layer. In order to obtain a strong in-plane magnetic anisotropy (high in-plane coercivity), it is preferable that the longitudinal magnetic recording medium has a c-axis, that is, an axis of easy magnetization of the magnetic layer is oriented into the in-plane direction. Hence, the Co alloy of the magnetic layer has an orientation in which the (11.0) plane is positioned in parallel to the substrate plane (called the (11.0) orientation) or another orientation in which the (10.0) plane is positioned in parallel to the substrate plane (called the (10.0) orientation). It is known that the crystal lattice of the magnetic layer may be controlled by the seed layer. Further, it has been reported that the former orientation can be obtained by using Ta (see JP-A-4-188427) or MgO (see Appl. Phys, Lett., vol. 67, pp. 3638–3640, December (1993)) for the seed layer and the latter orientation can be obtained by using an NiAl alloy having a B2 crystal structure (see IEEE Trans. Magns., vol 30, pp. 3951 to 3953 (1994)) for the seed layer.

In order to further enhance the orientation of the magnetic layer, it has been studied that a non-magnetic Co alloy having a hcp structure is formed as a third underlayer between the second underlayer composed of a Cr alloy and the magnetic layer composed of a Co alloy. This study is tried as remarking the fact that the crystal of the magnetic layer is grown on the Co alloy underlayer having the same hcp structure as that of the magnetic layer more microfine than on the Cr alloy underlayer having a bcc structure. As this type of example, the CoCr alloy (see JP-A-10-79113 or JP-A-10-233014) or the CoCrRu alloy (see JP-A-2000-113445) has been reported.

SUMMARY OF THE INVENTION

It is a first object of the present invention to provide a magnetic recording medium having a longitudinal recording density of 30 megabits or more per one square millimeter, which has a low noise and high coercivity, and is sufficiently stable for thermal fluctuation.

The inventors tried the following experiment. A non-magnetic alloy layer composed of a Co-40 at. % Ru alloy having a hexagonal closed packed structure (hcp structure) was laid between the magnetic layer and the Cr alloy underlayer. Then, the change of the characteristic was studied. As a result, when the Cr alloy underlayer has (100) orientation and the average grain size of the underlayer is as small as 20 to 25 nm or less, it was found that the characteristics such as the coercivity and reduction of noise are remarkably improved.

The magnetic recording medium of the first object has the following structure. That is, an amorphous first underlayer, a second underlayer of a body-centered cubic structure having Cr as a main component, a third underlayer of a hexagonal closed packed structure having Co as a main component, a magnetic layer of a hexagonal closed pack structure, and a carbon protective film, all of which are formed on the non-magnetic substrate vertically in this describing sequence. Then, a lubricant agent is coated on the carbon protective film. Herein, the term "amorphous" means that no obvious diffraction peak indicates that except a hollow pattern appears in the X-ray diffraction spectrum or the average grain size obtained from a lattice image imaged by a high resolution electronic microscope is 5 nm or less.

In order to keep the second underlayer of the body-centered cubic structure having Cr as a main component in the (100) orientation and make the average grain size smaller, it is preferable to form the first underlayer of the following amorphous alloy, in which alloy Cr is used as a main component and at least one element selected from the first element group consisting of Cr, V and Mn constitutes 30 at. % to 60 at. % and at least one element selected from the second element group consisting of Zr, Hf, Ta, Nb, Ti, W. Mo, B and Si constitutes 3 at. % to 30 at. %. If the total sum of the addition of the first element group is 30 at. % or less, the magnetization is not sufficiently cancelled, while if the total sum of the addition of the second element group is 60 at. % or more, undesirably, it is difficult to implement the amorphousness. Further, if the total sum of the addition of the second element group ranges from 3 at. % to 30 at. %, undesirably, the amorphousness cannot be implemented. The use of the amorphous Co alloy on the first underlayer makes it possible to become the grain size of the magnetic layer smaller, which is preferable to obtaining the medium with reduced noise.

As another method, it is possible to use, as the first underlayer, the following amorphous alloy in which Ni is used as a main component, at least one element selected from the foregoing first element group constitutes 50 at. % or less, and at least one element selected from the third element group consisting of Zr, Ta, Ti, W, Mo, B and Si constitutes 3 at. % to 60 at. %. In this case, since the magnetic layer has an especially strong (11.0) orientation, this amorphous alloy is preferable to obtaining a medium with high coercivity. If the addition of the element selected from the third element group causes the underlayer of the Ni alloy to be sufficiently non-magnetized, no addition of the first element group is required. If non-magnetization is not sufficient, it is necessary to add at least one element of the first element group. In order to prevent the underlayer of the Ni alloy from being crystallized, it is preferable to suppress the total sum of the addition to 50 at. % or less. Further, it is preferable to suppress the total sum of the addition of the third element group to 3 at. % to 60 at. % for the purpose of preventing the underlayer from being crystallized.

The alloy used for making the first underlayer is not limited only if it is amorphous and has a microfine crystal structure having an average crystal grain size of 5 nm or less. It was assured that the same effect in improving the characteristics as the above can be obtained by using amorphous a Cr-15 at. % Ti or Nb-15 at. % Si alloy for the first underlayer. Though it is preferable that the first underlayer is non-magnetic, if Br1·t1 (a product of residual magnetic flux density Br1 and a film thickness t1 of the first underlayer) is 20% or less of Br·tmag (a product of residual magnetic flux density Br and a film thickness tmag of the magnetic layer), no substantial problem takes place even if some magnetization is left.

Further, after forming the first underlayer, by exposing the first underlayer in a mixed gas atmosphere having argon as its main component where oxygen constitutes 1 to 10% for several seconds for the purpose of artificially oxidizing the surface of the first underlayer, it is possible to make the grain size of the second underlayer smaller. In this case, the grain size of the magnetic layer is also made smaller. Hence, the resulting medium has a far lower noise characteristic. This process is especially effective in the case of forming a film with a leaf type sputtering device having a high throughput in the condition that the vacuum degree of the base is roughly $7 \times 10^{-5}$ Pa or less, or the time taken between the formation of the first underlayer and that of the second underlayer is roughly 20 seconds or less. As another method, in a case that the first underlayer is formed in a mixed gas atmosphere having argon as its new component and an 1 to 10% oxygen, the same effect as the case of introducing the foregoing process of oxidizing the surface can be obtained. Though it is preferable to keep the substrate temperature at the time of forming the first underlayer to a room temperature, since the foregoing alloy material is made amorphous in the temperature of 100 to 200° C. or less, it is possible to heat the substrate for the purpose of degassing the substrate. Though the thickness of the first underlayer is not limited so much, it is preferable to keep it in the range of 20 nm to 100 nm in consideration of unique heating on the substrate and the crystallization caused by increasing the film thickness.

It is possible to use the second underlayer composed of a Cr alloy having a bcc structure in which Cr is used as a main component and Mo, W, V, Nb and Ta are included. In particular, preferably in the case of using a CrTi alloy in which Ti constitutes 3 at. % to 35 at. %, the resulting medium has a high coercivity and a low noise characteristic.

It is possible to use as the third underlayer an alloy material having Co as a main component and a 35 at. % to 60 at. % Ru. Since the Ru is larger in an atomic size than Co, the Co—Ru underlayer is especially suitable to the magnetic layer having a massive amount of Pt, which is as large as 12 to 14 at. %. If the content of Ru is less than 35 at. %, the magnetization is not sufficiently reduced, while if it is more than 65 at. %, the (10) orientation of the underlayer is broken. Hence, neither of the cases are preferable. Though it is preferable to make the third underlayer non-magnetic, if Br3·t3 (a product of residual magnetic flux density Br3 and a film thickness t3 of the third underlayer) is 20% or less of Br·tmag (a product of residual magnetic flux density Br and a film thickness tmag of the magnetic layer), no practical problem takes place even if some magnetization is left.

By adding an 1 at. % to 12 at. % B to the third underlayer having Co as its main component, the grain size of the underlayer is made uniform. This makes it possible to suppress the occurrence of so microfine a gain as 2 nm to 3 nm in the magnetic layer. Though the micro magnetic crystal grain is strongly suffered from the adverse effect of the thermal fluctuation, the thermal stability is improved by excluding these micro crystal grains. If the total sum of the addition of the foregoing elements is less than 1 at. %, the effect of making the grain size uniform is not sufficient, while if it is more than 12 at. %, the hcp structure of the third underlayer is broken. Hence, neither of the cases are preferable.

The magnetic layer may be composed of an alloy having Co as its main component such as a CoCrPtB alloy or a CoCrPtTaB alloy, that is, an alloy described in Co100-a-b-c-dCraPtbBcTad (16 at. %$\leq$a$\leq$22 at. %, 12 at. %$\leq$b$\leq$18 at. %, 4 at. %$\leq$c$\leq$12 at. %, 0 at. %$\leq$d$\leq$3 at. %). In order to reduce the exchange interaction between the magnetic grains and obtain a high read output, it is preferable to limit the content of Cr in the range of 16 at. % to 22 at. %. Further, in order to obtain high crystal magnetic anisotropy and an excellent overwrite characteristic, it is preferable to limit the content of Pt in the range of 12 at. % to 18 at. %. Further, in order to make the magnetic grain size smaller and thereby reduce the medium noise, it is preferable to include a 4 at. % to 12 at. % B. If B is more than 12 at. %, the hcp structure of the magnetic layer is broken. Further, the effect caused by making the grain size smaller is not sufficient if it is less than 4 at. %. Hence, neither of the cases are preferable. If Ta constitutes 3 at. % or less, the medium noise can be reduced without breaking the hcp structure of the magnetic layer. Hence, it is preferable to obtain the medium with a low noise characteristic.

As to the magnetic characteristic of the magnetic layer, it is preferable to keep the coercivity in the range of 270 kA/m (3402 oersted) to 360 kA/m (4536 oersted) and Br·tmag (a product of residual magnetic flux density Br and a film thickness tmag of the magnetic layer) in the range of 3.0 T·nm (30 G$\mu$m) to 7.0 T·nm (70 G$\mu$m). If the coercivity does not reach 270 kA/m, the recording resolution is made lower, while if it exceeds 360 kA/m, the overwrite characteristic is made degraded. Hence, neither of them are preferable. Further, if Br·tmag is less than 3.0 T·nm, the read output is made lower, while if it exceeds 7.0 T·nm, the resolution is made lower. Hence, neither of the cases are preferable. Further, in order to keep sufficient stability to thermal fluctuation, it is preferable to make a thermal stability factor (Ku·v/kT) 90 or higher (Ku: crystal magnetic anisotropy constant, v: magnetic grain volume, k: Boltzmann constant, T: absolute temperature). The thermal stability factor can be measured by fitting the time dependency of the residual coercivity to the Sharrock expression. According to the inventors' study, if the Ku·v/kT in the room temperature derived by this method is 90 or higher, the decay of the read output after five years is estimated as 10% or less. Hence, no problem on the reliability takes place. Further, though it is preferable to keep the magnetic layer in the (11.0) orientation, if the crystal grains in another orientation exist, no special problem takes place even if the diffraction peak strength from the crystal orientation plane in the X-ray diffraction spectrum is lower than the (11.0) diffraction peak strength.

Further, by forming the carbon with an addition of nitrogen as a protective film in the thickness of 3 nm to 7 nm and coating a lubricant layer composed of absorptive perfluoro-alkyl-polyether in the thickness of 1 nm to 4 nm, it is possible to form the magnetic recording medium that is highly reliable and has a high recording density. The use of a carbon film with an addition of hydrogen as a protective layer, a film composed of a compound such as silicon carbide, tungsten carbide, (W—Mo)—C or (Zr—Nb)—N, or a mixed film of these compounds and carbon results in improving durability and corrosion resistance.

It is a second object of the present invention to provide a magnetic recording apparatus using the magnetic recording medium described above.

The highly reliable magnetic recording apparatus of the second object has a magnetic recording medium described in the first object, a driving unit for driving the medium in the recording direction, a magnetic head composed of a recording unit and a read-back unit, a unit for moving the magnetic head relatively against the magnetic recording medium, and a read/write signal processing unit for inputting a signal into the magnetic head and reading back an output signal from the magnetic head, characterized by using any one of the foregoing media as the magnetic recording medium so that the in-plane recording density reaches 30 megabits or more per one square millimeter. The read-back section of the magnetic head is composed of a spin-valve sensor having a plurality of conductive magnetic layers whose magnetizing directions are relatively changed with respect to one another so that a large resistance change may take place and conductive non-magnetic layers positioned between the adjacent conductive magnetic layers. It is preferable that the sensor unit is formed between two shield layers composed of a soft magnetic material, spaced from each other by 0.15 $\mu$m or less. This is because if the interval between the shields is 0.15 $\mu$m or more, the resolution is made lower and the phase jitter of the signal is made larger. By arranging the storage device as described above, it is possible to implement a highly reliable magnetic recording apparatus having a far higher signal strength and a recording density of 30 megabits or more per one square millimeter.

It is a third object of the present invention to provide a magnetic recording medium having a longitudinal recording density of 35 megabits or more per one square millimeter.

The magnetic recording medium of the third object has a high S/N ratio and coercivity and being sufficiently stable to thermal fluctuation. A second underlayer of the recording medium uses an alloy containing Cr as a main component and Ti, and Mo or W, thereby realizing a high reliable magnetic recording medium of having 35 megabits or more per one square millimeter as a longitudinal recording density.

The magnetic recording medium of the third object has the following structure. That is, an amorphous first underlayer is formed on the non-magnetic substrate, a second underlayer of the b.c.c. structure having Cr as its main component is formed on the first underlayer, a third underlayer of the h.c.p structure having Co as its main component is then formed on the second underlayer and formed a magnetic layer of a the h.c.p structure thereon, and a protective layer having C as its main component is finally formed thereon. Then, a lubricant agent is coated on the protective layer. The sectional structure is epitaxially grown by performing the lattice matching of the (200) plane of the b.c.c structure of the second underlayer, the (11.0) plane of the h.c.p structure of the third underlayer, and the (11.0) plane of the h.c.p structure of the magnetic layer on their layer interfaces.

In the case of using a Co—Cr—Pt—B alloy for the magnetic layer, a Co—Ru alloy for the third underlayer or the underlayer composed of a Cr—Ti alloy having no Mo or W, the lattice constant of the second underlayer is smaller than that of the third underlayer. Hence, the epitaxial growth of the third underlayer on the second underlayer is made difficult, so that the sufficient (11.0) orientation of the magnetic layer cannot be obtained. Further, since the Cr—Ti alloy film is made smaller in crystal grains by restricting the content of Ti to about 20 at. %, the second underlayer is an essential element for obtaining the first and second objects of the invention (see J. Appl. Phys. 79, pp. 5351 to 5353 (1996)). However, with increase of the content of Ti, the lattice constant is made larger, while if the content of Ti exceeds 20% to 25%, the increase of the crystal grain size causes the increase of the noise on the medium. Hence, using the underlayer composed of the Cr—Ti alloy does not realize a magnetic recording medium having 35 megabits or more per one square millimeter.

Hence, the inventors have found the method of increasing the lattice constant by adding Mo or W to the Cr—Ti alloy and thereby enhancing the lattice matching with the third underlayer (Co—Ru matching layer). As a result, in actual, a lamination of the second underlayer (composed of the Cr—Ti—Mo alloy) and the third underlayer (a matching layer of the Co—Ru alloy) or a lamination of the second underlayer (composed of the Cr—Ti—W alloy) and the third underlayer (a matching layer of the Co—Ru alloy) make it possible to improve the (11.0) orientation of the magnetic layer, in particular, remarkably enhance the coercivity and the S/N ratio, enhancing a longitudinal recording density moreover.

As to the non-magnetic substrate 10 may be used alumino silicate, ceramics compose of soda lime glass, silicon, borosilicate glass or the like, an Al—Mg alloy substrate on which Ni—P is electroless-plated, a rigid substrate composed of glass on which Ni—P is electroless-plated, or the like.

In order to keep the second underlayer of the b.c.c. structure in the (200) orientation and make the average crystal grain size smaller, it is possible to use an amorphous alloy having Co as its main component and containing elements of Cr and Zr for the first underlayer. At this time, if the addition of Cr is less than 30 at. %, the magnetization cannot be sufficiently cancelled, while if it is more than 60 at. %, the amorphousness becomes difficult. Neither of the cases are preferable. It was assured that if the addition of Zr is 5 at. % to 15 at. %, the amorphousness is realized, the (200) orientation of the second underlayer is also realized, and the average crystal grain size is made smaller. As to the amorphous Co alloy used for the first underlayer, the Co—Cr—Ta alloy or the Co—Cr—W alloy having the same composition ratio is effective. Further, the first underlayer may use an amorphous alloy having Ni as its main component and containing the elements of Cr and Zr. In this case, if the addition of Cr is less than 20 at. %, the magnetization cannot be completely cancelled, while if it is more than 60 at. %, the amorphousness is made difficult. Hence, neither of the cases are preferable. When the addition of Zr is 5 at. % to 15 at. %, the amorphousness is achieved. It was assured that the (200) orientation of the second underlayer is realized and the average crystal grain-size is made smaller. As the amorphous Ni alloy is used an Ni—Ta alloy (the content of Ta is 35 to 40 at. %), an Ni—Ta—Zr alloy (the content of Ta is 35 to 40 at. % and the content of Zr is 5 to 15 at. %), and an Ni—Nb—Zr alloy (the content of Nb is 20 to 40 at. % and the content of Zr is 5 to 15 at. %). Further, the stiffness or Young's modulus may be adjusted by laminating the amorphous Co alloy film on the amorphous Ni alloy film for forming the first substrate. In this case, no substantial problem takes place in the foregoing effects.

Herein, it is preferable that the first underlayer is non-magnetic. However, if Br1·t1 (a product of residual magnetic flux density Br1 and a film thickness t1 of the first underlayer) is less than Br·tmag (a product of residual magnetic flux density Br and a film thickness tmag of the magnetic layer) by 20% or less, no substantial problem takes place even if some magnetization is left.

Further, by forming the first underlayer and exposing the first underlayer in a mixed gas atmosphere having argon as its main component and 1 to 10% oxygen added, argon for several seconds, for the purpose of artificially oxidizing the surface of the underlayer, as heating the underlayer up to 200 to 300° C. or after heated, the grain size of the second underlayer can be made smaller. In this case, the grain size of the magnetic layer is made more microfine, which leads to suppressing the noise of the medium. The introduction of the oxidizing process is quite effective in the case of using the sputtering device having its basic vacuum of about $7 \times 10^{-5}$ Pa or less for forming a film. Further, preferably, the substrate temperature required in forming the first underlayer should be a room temperature. However, if the substrate temperature ranges from 100 to 200° C., the alloy material is made amorphous. Hence, the substrate may be heated for the purpose of degassing the substrate. The thickness of the first underlayer is not limited especially. In actual, the thickness thereof should be 10 nm to 50 nm in consideration of the uniform heating of the substrate and the crystallization caused by the increase of the thickness.

The second underlayer may be used of an alloy having Cr as its main component and containing a 10 to 25 at. % Ti or a 2 to 20 at. % Mo or W. If the content of Ti is less than 10 at. %, the crystal matching to the third underlayer composed of a Co—Ru alloy formed thereon is made lower and the orientation of the magnetic layer is made degraded accordingly. Hence, the case is not preferable. On the other hand, if the content of Ti exceeds 25 at. %, the crystal grain size of the second underlayer is increased and thereby the medium noise is increased. Further, the content of Mo or W to be added to the second underlayer should be 2 to 20 at. %, because the content makes the crystal matching excellent. By adding an 1 to 10 at. % B to the second underlayer, preferably, the grain size of the second underlayer may be made uniform.

The third underlayer may be used a Co alloy material containing a 35 to 60 at. % Ru. If the content of Ru is less than 35 at. %, the magnetization can be completely reduced, while if it is more than 60 at. %, the crystal matching to the magnetic layer may be made lower. Hence, neither of the cases are preferable. Though it is preferable to make the third underlayer non-magnetic, if Br3·t3 (a product of residual magnetic flux density Br3 and a film thickness t3 of the third underlayer) is equal to or less than 20% of Br·tmag (a product of residual magnetic flux density Br and a film thickness tmag of the magnetic layer), no practical problem takes place if some magnetization is left.

The magnetic layer may be composed of a Co—Cr—Pr—B alloy having Co as its main component in which a Cr concentration is 16 to 22 at. %, a Pt concentration is 12 to 18 at. %, a B concentration is 4 to 12 at. %, and the remaining portion is Co. In order to reduce the exchange interaction among the magnetic grains and obtain a high read output, it is preferable to make the content of Cr range from 16 to 22 at. %. In order to obtain high crystal magnetic anisotropy and an excellent overwrite characteristic, it is preferable to make the content of Pt the range from 12 to 18 at. %. Further, by making the magnetic grain size small and thereby reducing the medium noise, it is preferable to make the content of B range from 4 to 12 at. %. If the content of B exceeds 12 at. %, undesirably, the h.c.p structure of the magnetic layer is broken.

As to the magnetic characteristic of the magnetic layer, the coercivity should be 300 kA/m (3770 oersted) to 370 kA/m (4650 oersted) and the Br·tmag should be 3.0 T·nm (30 G$\mu$m) to 7.0 T·nm (70 G$\mu$m). If the coercivity does not reach 300 kA/m, the recording resolution is made lower, while if it exceeds 370 kA/m, the overwrite characteristic is made degraded. Hence, neither of the cases are preferable. Further, if Br·tmag is less than 3.0 T·nm, the read output is made lower, while if it exceeds 7.0 T·nm, the resolution is made lower. Hence, neither of the cases are preferable. Moreover, in order to keep the sufficient stability to the thermal fluctuation, it is preferable to enlarge a thermal stability factor kuV/KT (Ku: crystal magnetic anisotropy constant, V: magnetic grain volume, k: Boltzmann constant, T: absolute temperature). Though the thermal stability factor is variable according to the various measuring methods, as disclosed in J Magn. Magn. Mater. 127, pp. 233 (1993), the time dependency on the residual coercivity may be measured by fitting it to the Sharrock expression. According to the inventors' study, if KuV/kT in the room temperature derived by this method is 90 or more, the decay of the read output after five years may be estimated to be 10% or less and thus no problem on the reliability was found. Further, though the magnetic layer should have the (11.0) orientation, even if the other crystal grains have another crystal orientation, no special problem was found only if the diffraction peak intensity from the crystal orientation plane in the X-ray diffraction spectrum is lower than the (11.0) diffraction peak intensity.

By forming as a protective layer carbon having an addition of nitrogen in the thickness of 3 to 6 nm and coating a lubricant layer of absorptive perfluoroalkyl polyether in the thickness of 1 to 2 nm, the resulting magnetic recording medium is made to be highly reliable and to have a high recording density. Further, the use of a carbon film with an addition of hydrogen, a film composed of a compound such as silicon carbide, or a mixed film of the compound and the carbon, makes it possible to disadvantageously improve the durability and corrosion resistance.

By mounting those media described above to the magnetic recording apparatus described with respect to the second object of the invention, it is possible to implement a highly reliable magnetic recording apparatus having a recording density of 35 megabits or more per one square millimeter.

DETAILED DESCRIPTION OF THE EMBODIMENTS

Hereafter, the embodiments of the invention will be described in detail with reference to the appended drawings.

Figure 1:
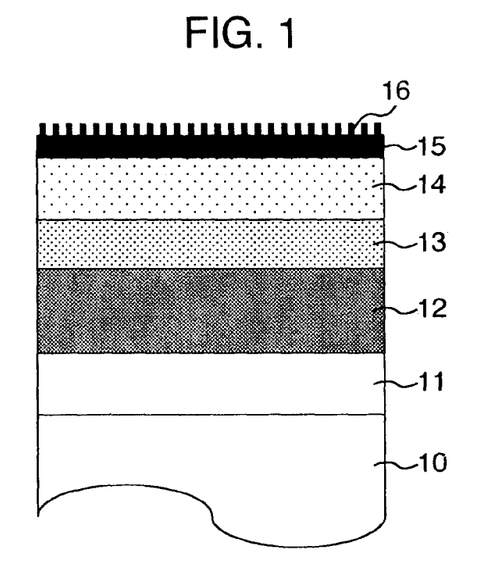
FIG. 1 is a model view showing a sectional structure of a magnetic recording medium according to a first embodiment of the invention.

FIG. 1 shows a sectional structure of a medium according to an embodiment of the invention. As shown, on a non-magnetic substrate 10, are formed an amorphous first underlayer 11 is formed thereon, a second underlayer 12 of a body-centered cubic structure having Cr as a main component is formed on the first underlayer, a third underlayer 13 of a hexagonal closed packed structure having Co as its main component is then formed on the second underlayer, a magnetic layer 14 of a hexagonal closed packed structure is formed on the third underlayer, and a carbon protective film 15 is formed thereon as viewed from the bottom to the top of FIG. 1. The term "amorphous" herein means that no obvious diffraction peak except a hollow pattern appears in the X-ray diffraction spectrum or the average grain size obtained from a lattice image imaged by a high resolution electronic microscope is 5 nm or less.

(First Embodiment)

A substrate composed of alumino silicate system tempered glass being 64 mm in diameter and 0.635 mm in thickness was alkali-cleaned and then dried. Then, the substrate was put into a leaf type film forming apparatus having a plurality of chambers. Next, the apparatus was shifted into a vacuum state. A first underlayer 11 was formed in the thickness of 30 nm by the DC sputtering method in an atmosphere where an argon gas pressure is 0.8 to 1.0 Pa without heating the substrate. As the first underlayer material was used a Co-32 at. % CR-6 at. % Zr, Co-32 at. % Cr-12 at. % Hf, Co-36 at. % Cr-8 at. % Ta, Co-34 at. % Cr-25 at. % W, Co-40 at. % V-6 at. % Ti, Co-40 at. % V-8 at. % B, Co-50 at. % V-12 at. % Si, Co-45 at. % Mn-20 at. % Nb, Co-45 at. % Mn-25 at. % Mo, Ni-38 at. % Ta, Ni-55 at. % W, Ni-40 at. % Cr-8 at. % Zr, Ni-40 at. % Cr-12 at. % Ti, Ni-50 at. % V-15 at. % B, Ni-55 at. % V-15 at. % Si, or Ni-38 at. % V-30 at. % Mo alloy. After forming the first underlayer 11, the substrate was conveyed into a heating chamber in which it was heated up to 240° C. by means of a lamp heater. Then, the substrate was conveyed into a blank chamber located between the heating chamber and the chamber for forming the first underlayer 12, in which blank chamber the substrate was left for five or six seconds. At this time, a mixed gas having argon with 1% oxygen added was introduced into the blank chamber so that the gas pressure may reach 1.0 Pa. Next, the second underlayer 12 was formed of a Cr-20 at. % Ti alloy to have a thickness of 20 nm. The third underlayer was formed of a Co-40 at. % Ru alloy to have a thickness of 5 nm. The magnetic layer 14 was formed of a Co-20 at. % Cr-14 at. % Pt-6 at. % B alloy to have a thickness of 14 nm to 20 nm. Then, the carbon protective film 15 was formed to have a thickness of 4.5 nm. Like the first underlayer 11, each alloy layer was formed in an argon gas atmosphere of 0.8 to 1.23 Pa by means of the DC sputtering method. However, only the carbon protective film 15 was formed in an atmosphere of a mixed gas having argon as its main component with an addition of a 20% nitrogen gas. The thickness of the magnetic layer 14 was adjusted so that the Br·tmag (a product of residual magnetic flux density Br and a film thickness tmag of the magnetic layer) may come closer to 5T·nm. The foregoing formations of the layers were carried out by means of the alloy target having a diameter of 110 nm and a thickness of 6.4 mm. The input power was 0.6 kW to 1.2 kW. The tact time was 12 seconds. As to a comparison reference, the medium having the first underlayer 11 formed of Cr was produced in the same condition as the medium of this embodiment.

Figure 2A:
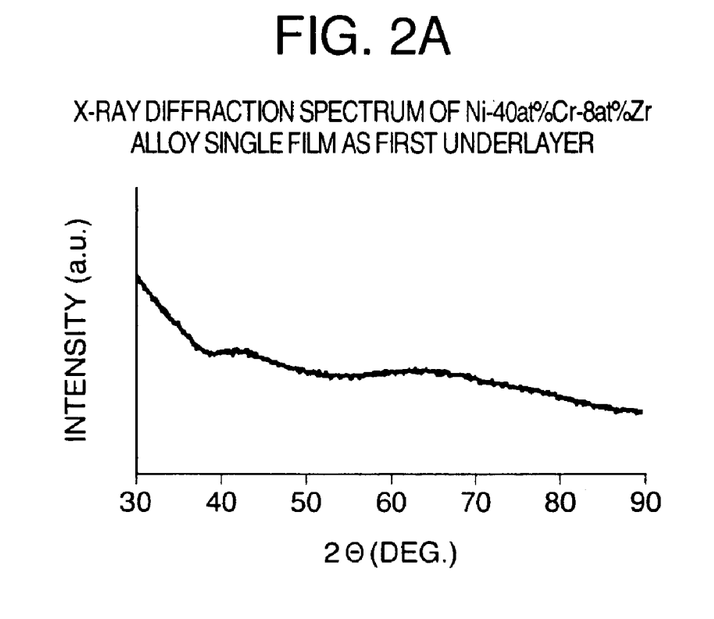
FIG. 2A is a graph showing an X-ray, diffraction spectrum of a first underlayer included in the first embodiment.
Figure 2B:
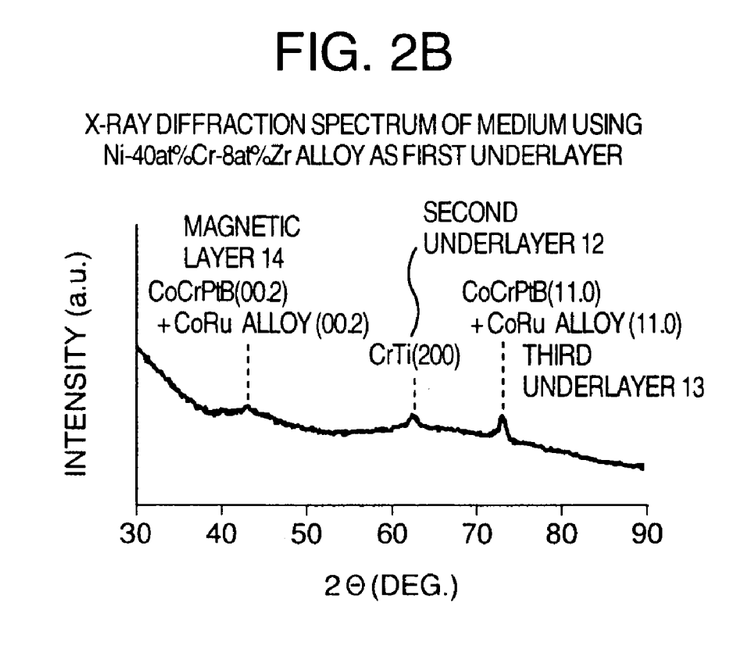
FIG. 2B is a graph showing an X-ray diffraction spectrum of a second underlayer included in the second embodiment.

FIG. 2A shows an X-ray diffraction spectrum of an Ni-40 at. % Cr-8 at. % Zr alloy film used as the first underlayer 11, as indicated a 12th medium on Table 1, of this embodiment on a glass substrate to have a thickness of 30 nm in the foregoing film-forming condition. In this measurement, the X-ray source was a CuKα1 ray that is made monochromatic by a monochrometer. No obvious diffraction peak was found. What was observed is only a broad hollow pattern around 2θ=40 to 43°. Like another alloy film used for the first underlayer 11, only the hollow pattern was observed. Further, the alloy films of the first underlayers used in this embodiment were observed by means of a high resolution electron microscope. The average grain size of each layer was 5 nm or less. This result indicates that all the first underlayers used in this embodiment have an amorphous or a fine crystal structure. FIG. 2B shows the X-ray diffraction spectrum of a 12th medium indicated on Table 1 as formed all the layers from the first underlayer 11 to the carbon protective film 15. What was observed in this graph is the (200) diffraction peak from the CrTi underlayer (second underlayer 12) and the mixed (11.0) diffraction peak from the CoRu underlayer (third underlayer 13) and the CoCrPtB magnetic layer. It was found that the in-plane orientation medium is strong. The other medium of this indicates the similar spectrum. On the other hand, in the medium 14 of the comparison reference 1 listed in Table 1, the Cr underlayer (first underlayer 11 of Table 1) and the CrTi underlayer (second underlayer 12) indicated the (110) orientation. The strong (10.1) diffraction peak and (00.2) diffraction peak were found on the CoRu underlayer (third underlayer 13) and the magnetic layer 14.

Table 1 lists some factors such as an electrostatic characteristic, a normalized noise, a medium S/N ratio, and a thermal stability factor (Ku·v/kT).

TABLE 1

| First Embodiment | First Underlayer | Hc (kA/m) | Br · tmag (nWb) | Normalized Noise (μVrms/μVpp) | Media S/N (dB) | Ku · v/kT |
|---|---|---|---|---|---|---|
| 1 | Co-32at % Cr-6at % Zr | 300 | 5.2 | 0.0246 | 21.2 | 92 |
| 2 | Co-32at % Cr-12at % Hf | 310 | 4.9 | 0.0269 | 20.5 | 98 |
| 3 | Co-36at % Cr-8at % Ta | 309 | 5.1 | 0.0254 | 20.8 | 93 |
| 4 | Co-34at % Cr-25at % W | 316 | 5.0 | 0.0267 | 20.7 | 97 |
| 5 | Co-40at % V-6at % ti | 310 | 5.2 | 0.0264 | 20.4 | 97 |
| 6 | Co-40at % V-8at % B | 306 | 4.8 | 0.0254 | 21.0 | 90 |
| 7 | Co-50at % V-12at % Si | 303 | 4.9 | 0.0247 | 20.9 | 91 |
| 8 | Co-45at % Mn-20at % Nb | 314 | 4.9 | 0.0263 | 20.6 | 95 |
| 9 | Co-45at % Mn-25at % Mo | 317 | 5.0 | 0.0270 | 20.6 | 96 |
| 10 | Ni-38at % Ta | 343 | 5.1 | 0.0284 | 21.1 | 113 |
| 11 | Ni-55at % W | 325 | 4.9 | 0.0286 | 20.3 | 116 |
| 12 | Ni-40at % Cr-8at % Zr | 337 | 5.2 | 0.0296 | 20.9 | 117 |
| 13 | Ni-40at % Cr-12at % Ti | 324 | 5.1 | 0.0287 | 20.4 | 108 |
| 14 | Ni-50at % V-15at % B | 328 | 5.0 | 0.0297 | 20.2 | 111 |
| 15 | Ni-55at % V-15at % Si | 341 | 4.9 | 0.0293 | 21.0 | 114 |
| 16 | Ni-38at % V-30at % Mo | 326 | 5.1 | 0.0293 | 20.5 | 106 |
| Comparison Reference | Cr | 273 | 5.2 | 0.0337 | 19.6 | 121 |

Herein, the normalized noise was defined as a normalized noise=Nd/SLF (μVrms/μVpp) through the use of the medium noise (Nd), and the isolated read-back wave output (SLF) appearing when the data was recorded on the medium with a linear recording density of 20.5 kFC/mm (520 kFCI). The medium S/N ratio was defined as a medium S/N=20 log (SMF/2/Nd) (dB) through the use of the read output (SMF) appearing when the data was recorded on the medium with a linear recording density of 10.3 kFC/mm (260 kFCI) being half as large as the foregoing linear recording density. The normalized noise and the medium S/N ratio were estimated through the use of a composite head incorporating a recording head having a track width of 0.77 μm and a gap length of 0.20 μm and a spin-valve type read head having a track width of 0.50 μm and a gap length of 0.10 μm. The magnetic spacing defined as a total sum of the protective film of the magnetic head, a worked step, a head flying height and a medium protective film 15, was set as 26 nm. The electrostatic characteristic was measured by applying a maximum magnetic field of 794 kA/m (10000 oersted) through the use of a vibrating sample magnetometer. The thermal stability factor (Ku·v/kT) was derived by fitting the time dependency of the residual coercivity (Hcr) for 7.5 to 240 seconds in the room temperature to the Sharrock expression.

In this embodiment, the coercivity was as high as 300 kA/m (3780 oersted). Further, the normalized noise was lower by 10 to 30% and the medium S/N ratio was higher by about 0.6 dB to 1.6 dB than those of the medium of the comparison reference. The medium having the first underlayer 11 composed of the Co-32 at. % Cr-6 at. % Zr, Co-36 at. % Cr-8 at. % Ta, Co-40 at. % V-8 at. % B, or Co-50 at. % V-12 at. % Si alloy indicates a far lower normalized noise. The medium having the first underlayer 11 composed of the Ni-38 at. % Ta, Ni-40 at. % Cr-8 at. % Zr, or Ni-55 at. % V-15 at. % Si alloy indicates a far higher coercivity. Both of the media indicated 90 or more thermal stability factor (Ku·v/kT), which was sufficiently stable to the thermal fluctuation.

(Second Embodiment)

An alkali-cleaned soda lime based glass substrate 10 that is 64 mm in diameter and 0.635 in thickness was heated up to 100° C. and the Co-35 at. % Cr-12 at. % Zr alloy was formed as the first underlayer 11 to have a thickness of 40 nm through the effect of the film-forming apparatus described with respect to the first embodiment. The underlayer was formed by using the mixed gas having argon as its main component with an addition of a 10% oxygen and at a gas pressure of 2.7 Pa. Afterwards, the substrate was heated up to 260° C. The second underlayer 12 is formed of the Cr-25 at. % W alloy to have a thickness of 30 nm and the third underlayer 13 is formed of the Co alloy to have a thickness of 5 nm. The magnetic layer 14 is then formed of a Co-22 at. % Cr-14 at. % Pt-4 at. % B to have a thickness of 14 to 20 nm, and the carbon protective film 15 is formed with 6 nm thick. Herein, the third underlayer 13 of the Co alloy was used of the Co-30 at. % Ru, Co-35 at. % Ru, Co-40 at. % Ru, Co-50 at. % Ru, Co-60 at. % Ru, or Co-70 at. % Ru alloy. Further, except the carbon protective film 15, the layers were formed at an argon gas pressure of 0.8 Pa. The carbon protective film 15 was formed by using a mixed gas having argon gas as its main component with an addition of 10% nitrogen and at a gas pressure of 2.0 Pa. The film pressure of the magnetic layer 14 was adjusted so that Br·tmag may be about 4 nWb. As a reference, the medium having the third underlayer formed of the Co-20 at. % Cr-40 at. % Ru alloy was formed in the same process condition as described above.

Figure 3:
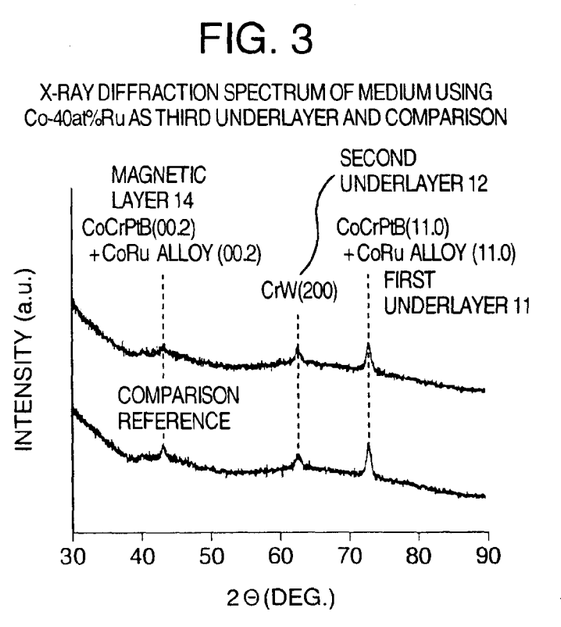
FIG. 3 is a graph showing X-ray diffraction spectrums of a third underlayer included in the second embodiment and of a comparison reference.

FIG. 3 shows the X-ray diffraction spectrum of this embodiment in which the third underlayer 13 is formed of the Co-40 at. % Ru alloy and the X-ray diffraction spectrum of the medium (see Table 2) of the comparison reference. In this embodiment, the (200) diffraction peak of the CrW underlayer (second underlayer 12) and the (11.0) diffraction peak that may be considered to come from a mixture of the CoRu underlayer (first underlayer 11) and the CoCrPtB magnetic layer. On the other hand, the medium of the comparison reference 2 shows a relatively strong (00.2) diffraction peak appeared in addition to the foregoing diffraction peak. It was understood from this result that the third underlayer 13 formed of the CoRu alloy with no content of Cr may offer a stronger in-plane orientation medium. Even in the embodiment where the third underlayer 13 is formed of another CoRu alloy, the similar X-ray diffraction spectrum to that of the foregoing embodiment appeared.

Table 2 lists an electrostatic characteristic, a normalized noise, a medium S/N ratio, and a thermal stability factor (Ku·v/kT) of the medium of this embodiment.

TABLE 2

| Second Embodiment | Third Underlayer | Hc (kA/m) | Br · tmag (nWb) | Normalized Noise ($\mu$Vrms/$\mu$Vpp) | Media S/N (dB) | Ku · v/kT |
|---|---|---|---|---|---|---|
| 1 | Co-30at % Ru | 285 | 4.6 | 0.0277 | 19.6 | 101 |
| 2 | Co-35at % Ru | 301 | 4.6 | 0.0267 | 20.5 | 98 |
| 3 | Co-40at % Ru | 311 | 4.4 | 0.0256 | 21.1 | 91 |
| 4 | Co-50at % Ru | 314 | 4.4 | 0.0261 | 20.8 | 103 |
| 5 | Co-60at % Ru | 306 | 4.5 | 0.0271 | 20.4 | 111 |
| 6 | Co-70at % Ru | 269 | 4.5 | 0.0290 | 19.3 | 119 |
| Comparison Reference | Co-40at % Ru-20at % Cr | 265 | 4.6 | 0.0303 | 19.1 | 123 |

These values were measured by the same method as that of the first embodiment. Every kind of medium of this embodiment shows a higher coercivity and medium S/N ratio than the medium of the comparison reference. It also shows 90 or higher Ku·v/kT, which means the thermal stability is excellent. The medium in which the third underlayer 13 contains a 35 to 60 at. % Ru shows a far higher normalized than the medium of the comparison reference 2 by 10% or more and a higher medium S/N ratio by 1 dB or more. It was understood from this result that for obtaining a medium with a low noise and a high S/N ratio, the Ru content of the third underlayer 13 is arranged to be 35 to 60 at. %.

(Third Embodiment)

The medium having the similar composition to that of the second embodiment, in which as the third underlayer 13 is used of the Co-40 at. % Ru, Co-40 at. % Ru-1 at. % B, Co-40 at. % Ru-3 at. % B, Co-40 at. % Ru-6 at. % B, Co-40 at. % Ru-12 at. % B, or Co-40 at. % Ru-15 at. % B alloy and as the magnetic layer 14 is used of the Co-18 at. % Cr-16 at. % Pt-6 at. % B alloy in the thickness of 14 nm, was manufactured by the similar film forming process to that of the second embodiment. When this medium was subject to the X-ray diffraction measurement, like the embodiment of the second embodiment, what was observed is only the (200) diffraction peak of the CrW underlayer 12 and the (11.0) diffraction peak of a mixture of the Co alloy underlayer 11 and the CoCrPtB magnetic layer 14.

The magnetic layer included in this embodiment was observed by using the high resolution transmission electron microscope. The lattice image was magnified to 2 million times and imaged. The grain sizes of about 200 crystal grains were analyzed on the obtained lattice image. At this time, the area where the lattice pattern has the same orientation is considered as one crystal grain, and the crystal grains having the structure where the adjacent c-axes are perpendicular to each other (called the bi-crystal structure) were considered as the other crystal grains. The diameter of the circle having the same area as the observed crystal grain was defined as the size of each crystal grain. Table 3 lists the average grain size <d>, the standard deviation δ, and the thermal stability factor (Ku·v/kT) derived by the mean value method.

TABLE 3

| Third Embodiment | Third Underlayer | <d> (nm) | σ (nm) | σ/<d> | Ku · v/kT |
|---|---|---|---|---|---|
| 1 | Co-40at % Ru | 11.6 | 3.9 | 0.34 | 108 |
| 2 | Co-40at % Ru-1at % B | 11.0 | 3.3 | 0.30 | 102 |
| 3 | Co-40at % Ru-3at % B | 10.4 | 2.9 | 0.28 | 95 |
| 4 | Co-40at % Ru-6at % B | 10.1 | 2.7 | 0.27 | 94 |

TABLE 3-continued

| Third Embodiment | Third Underlayer | <d> (nm) | σ (nm) | σ/<d> | Ku · v/kT |
|---|---|---|---|---|---|
| 5 | Co-40at % Ru-12at % B | 9.8 | 2.8 | 0.28 | 91 |
| 6 | Co-40at % Ru-15at % B | 9.5 | 3.0 | 0.32 | 90 |

In the magnetic layer 14 of this embodiment, the average grain size is as microfine as 12 nm or less but the Ku·v/kT is 90 or more, which indicates the stability to the thermal fluctuation. In the medium where the content of B of the third underlayer 13 is 1 to 12 at. %, the average grain size of the magnetic layer 14 was 11 nm or less and the standard deviation was less than the average grain size by 30%. It was obvious from this result that the use of the Co—Ru—B alloy having an 1 to 12 at. % B for the third underlayer 13 makes it possible to obtain the medium in which the crystal grains of the magnetic layer 14 are microfine and uniform.

(Fourth Embodiment)

The medium having the same film composition as that of the first embodiment, in which as the first underlayer 11 is used of the Ni-45 at. % Cr-12 at. % Zr alloy and as the magnetic layer 14 is used of the Co-20 at. % Cr-14 at. % Pt-6 at. % B alloy or the Co-18 at. % Cr-16 at. % Pt-8 at. % B alloy, was produced. The thickness of the magnetic layer 14 was varied from 14 nm to 19 nm and the value of Br·tmag was varied from 4.5 T·nm to 6.0 T·nm. The electrostatic characteristics and the read/write characteristics were estimated by the same method as the first embodiment.

Figure 4A:
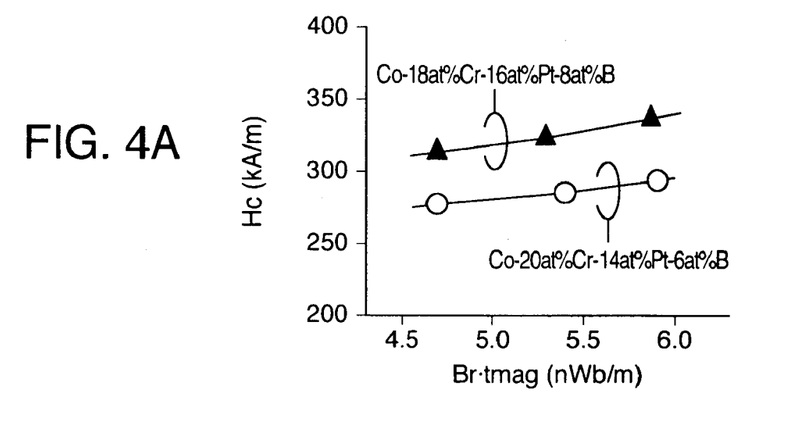
FIG. 4A is a graph showing relation between coercivity and dependency of Br·tmag of a medium in a fourth embodiment.
Figure 4B:
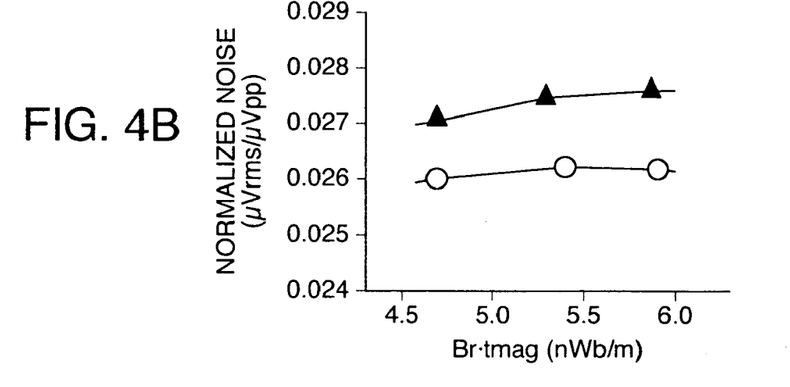
FIG. 4B is a graph showing relation between normalized noises and dependency of Br·tmag of the medium in the fourth embodiment.
Figure 4C:
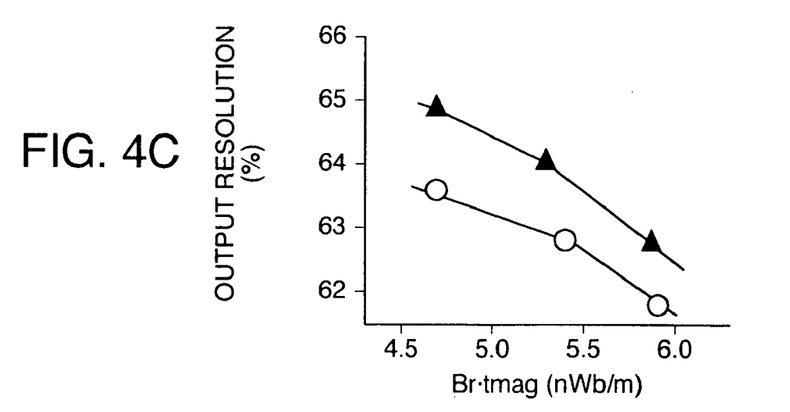
FIG. 4C is a graph showing relation between an output resolution and dependency of Br·tamg of the medium in the fourth embodiment.

FIGS. 4A, 4B and 4C show dependency of the coercivity Hc, the normalized noise and the output resolution on Br·tmag. Herein, the normalized noise was recorded at a linear recording density of 20.5 kFC/mm. The output resolution was defined as SMF/SLF×100 (%) through the use of the read output (SMF) and the isolated read wave output (SLF) that are recorded at a linear recording density of 10.3 kFC/mm, a half of the foregoing recording density. Any medium indicated as high a coercivity as 280 kA/m or higher. The medium having the magnetic film 14 composed of the Co-18 at. % Cr-16 at. % Pt-8 at. % B alloy indicates a higher coercivity at the same value of Br·tmag. This medium also indicates a higher output resolution by 1 to 1.5 points at the same value of Br·tmag. On the other hand, the medium having the magnetic value 14 composed of the Co-20 at. % Cr-14 at. % Pt-6 at. % B alloy indicates a lower medium noise irrespective of the value of Br·tmag. It was understood from this result that both of the media indicates a higher medium S/N than 20 dB and provides an excellent characteristic if the read/write was executed at a higher linear read/write density than 20.5 kFC/mm. Further, it was understood that the value of Ku·v/kT was 90 or more for any medium and was stable to the thermal fluctuation.

(Fifth Embodiment)

The medium having the same film composition as that of the first embodiment, in which as the magnetic layer 14 is used of the Co-20 at. % Cr-14 at. % Pt-6 at. % B, Co-18 at. % Cr-14 at. % Pt-6 at. % B, Co-20 at. % Cr-14 at. % Pt-8 at. % B, Co-18 at. % Cr-14 at. % Pt-8 at. % B, Co- 20 at. % Cr-16 at. % Pt-8 at. % B, Co-18 at. % Cr-16 at. % Pt-8 at. % B or the Co-22 at. % Cr-14 at. % B alloys, was produced. The thickness of the magnetic layer 14 was varied from 13 nm to 19 nm and the value of Br·tmag was varied from 3.5 T·nm to 5.5 T·nm. The second underlayer 12 was formed of Cr-15 at. % Ti alloy to have a thickness of 15 nm and the third underlayer 13 was formed of Co-45 at. % Ru alloy to have a thickness of 10 nm. The thickness of the carbon protective film 15 was 4.0 nm. The process condition in forming each layer is the same as that of the first embodiment.

Figure 5A:
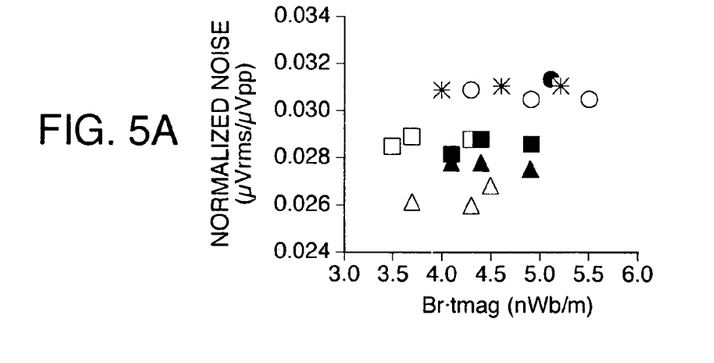
FIG. 5A is a graph showing relation between normalized noise and dependency of Br·tmag of a medium included in a fifth embodiment.
Figure 5B:
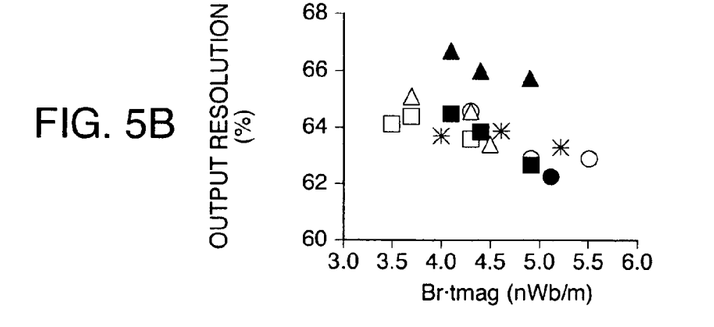
FIG. 5B is a graph showing relation between an output resolution and dependency of Br·tmag of the medium included in the fifth embodiment.
Figure 5C:
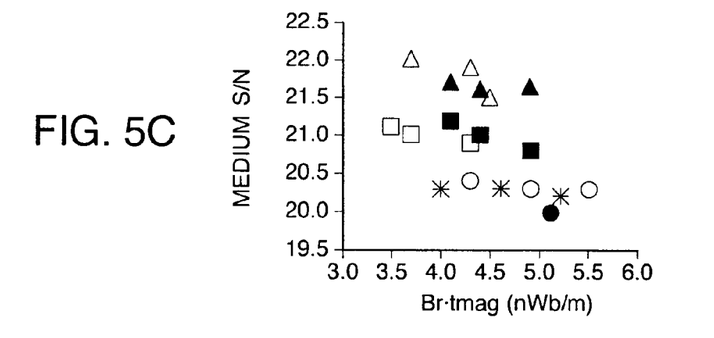
FIG. 5C is a graph showing relation between a medium S/N and dependency of Br·tmag of the medium included in the fifth embodiment.

FIGS. 5A, 5B and 5C show dependency of the normalized noise, the output resolution and the medium S/N at the linear recording density of 20.5 kFC/mm on the value of Br·tmag. Estimating the read/write characteristics was used with a composite head having a recording head and a read head. The recording head has a track width of 0.70 µm and a gap length of 0.18 µm. The read head has a track width of 0.46 µm and a gap length of 0.09 µm. The magnetic spacing was 28 nm. The medium having the magnetic layer 14 composed of the 20 at. % Cr-16 at. % Pt-8 at. % B alloy indicates a far lower medium noise than any other media. On the other hand, the medium having the magnetic layer 14 composed of the 18 at. % Cr-16 at. % Pt-8 at. % B alloy indicates a far higher output resolution than any other media. All the media of this embodiment indicates a higher medium S/N ratio than 20 dB. In particular, the medium having the magnetic layer 14 composed of the Co-20 at. % Cr-16 at. % Pt-7 8 at. % B alloy or the Co-18 at. % Cr-16 at. % Pt-8 at. % B alloy as contained a 16 at. % Pt and an 8 at. % B, indicates a far higher medium S/N ratio. Pursuant to these media, the medium having the magnetic layer 14 composed of the Co-20 at. % Cr-14 at. % Pt-8 at. % B alloy or the Co-18 at. % Cr-14 at. % Pt-8 at. % B alloy, as contained a 14 at. % Pt and an 8 at. % B, indicates a higher medium S/N ratio.

(Sixth Embodiment)

The medium, in which the first underlayer 11 is formed of the Co-38 at. % Cr-20 at. % W alloy to have a thickness of 25 nm, the second underlayer 12 is formed of the Cr, Cr-3 at. % Ti, Cr-10 at. % Ti, Cr-20 at. % Ti, Cr-30 at. % Ti, Cr-35 at. % Ti, or Cr-40 at. % Ti alloy to have a thickness of 15 nm, the third underlayer 13 is formed of the Co-55 at. % Ru-3 at. % B alloy to have a thickness of 3 nm, and the magnetic layer 14 is formed of the Co-20 at. % Cr-14 at. % Pt-7 at. % B-1 at. % Ta alloy to have a thickness of 15 nm, was produced by the same film-forming condition as that of the first embodiment.

Figure 6:
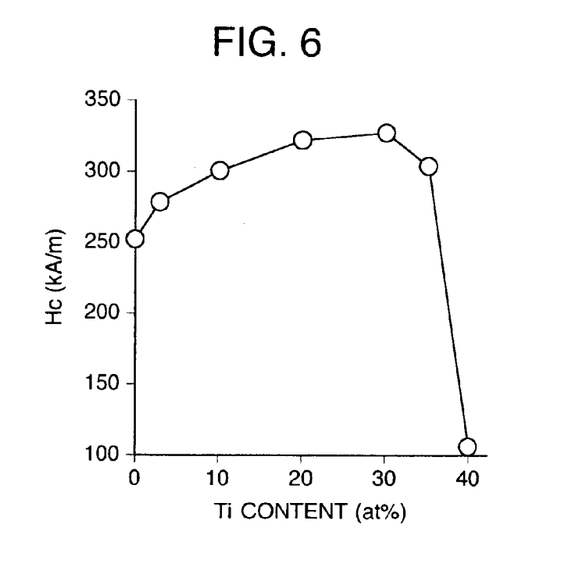
FIG. 6 is a graph showing relation between coercivity of the medium and a Ti content of the second underlayer in the firth embodiment.

FIG. 6 shows the relation between the coercivity and the Ti content of the second underlayer 12 of the medium according to this embodiment. As shown in FIG. 6, the medium in which the content of Ti is 3 to 35 at. % indicates as high a coercivity as 300 kA/m or more, while the medium having the second underlayer 12 composed of a pure Cr or Cr-40 at. % Ti alloy indicates a far lower coercivity. When the medium is subject to the X-ray diffraction measurement, in the medium having the second underlayer 12 composed of the Cr-40 at. % Ti alloy, the c axes of the magnetic layer 14 were oriented substantially perpendicularly to each other. It was understood from the above description that if the second underlayer 12 is formed of the Cr—Ti alloy, the content of Ti should be 3 to 35 at. %.

(Seventh Embodiment)

Figure 7:
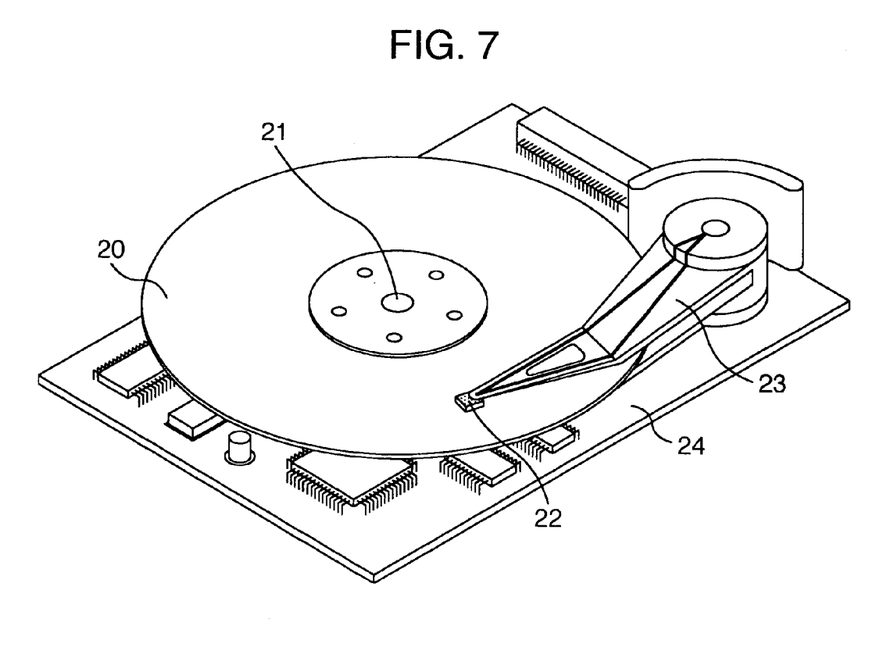
FIG. 7 is a perspective view showing a magnetic recording apparatus according to a seventh embodiment of the invention.

The medium described in the first embodiment was incorporated into the magnetic storage apparatus shown in FIG. 7. The storage apparatus includes a recording medium 20, a driver 21 for driving the recording medium 20 in the recording direction, a composite magnetic head 22 composed of an inductive head for recording and a spin-valve head for reading, a unit 23 for moving the head relatively against the medium, and a read/write signal processing unit 24 for the head.

Figure 8:
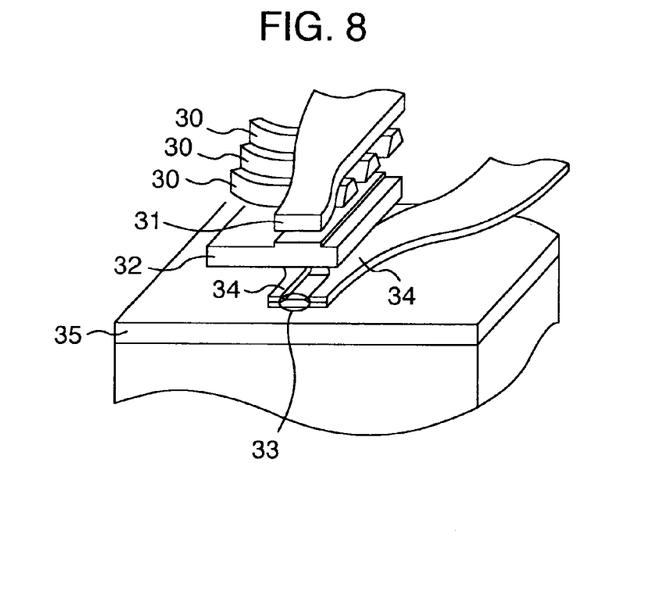
FIG. 8 is a perspective view showing a sectional structure of a magnetic head according to the present invention.

The structure of the magnetic head used in this embodiment is shown in FIG. 8. This magnetic head is a composite head having an inductive head for recording and a spin-valve head for reading, both of which are formed on the substrate. The recording head is composed of an upper recording magnetic pole 31 and an upper shield layer 32 served as a lower recording magnetic pole, between which a coil 30 is located. The gap layer thickness between the recording magnetic poles was arranged as 0.19 µm. The coil was formed of Cu to have a thickness of 3 µm. The read head is composed of a spin-valve sensor 33 and electrode patterns 34 located on both ends of the sensor 33. The sensor is located between the upper shield layer served as the lower recording magnetic pole and a lower shield layer 35, the distance therebetween being 0.10 µm.

The spin valve sensor has a structure having a Ta buffer layer in the thickness of 5 nm, a first magnetic layer formed of the Ni-20 at. % Fe alloy to have a thickness of 7 nm, a Cu intermediate layer with 1.5 nm thick, a second magnetic layer formed of Co to have a thickness of 3 nm, and an anti-ferromagnetic alloy layer formed of the Fe-50 at. % Mn to have a thickness of 10 nm ranged from the bottom to the top.

The read/write characteristics were estimated by the present apparatus in which the in-plane recording density is 30 megabits/square millimeters (19.4 Gbit/square inches) (linear recording density of 20.9 kbit/mm (530 kBPI) and a track density of 1.44 k tracks/mm (36.6 kTPI)) and the magnetic spacing is 28 nm. As a result, the bit error rate was $5 \times 10^{-7}$ or less. It was understood from this result that the present magnetic recording apparatus enables to read and write data at an in-plane recording density of 30 megabits/square millimeters. Further, when the CSS test (Contact Start Stop Test) was performed, the friction coefficient was 0.3 or less. This was checked by doing CSS tests of 30,000 times. The number of bit error after 50,000 head seek tests from the inner periphery to the outer one of the medium was 10 bits/plane or less, which means that the MTBF (Mean Time Between Failures) of 300,000 hours or longer was achieved.

(Eighth Embodiment)

According to a first composition of the eighth embodiment, an alumino silicate system tempered glass substrate having a diameter of 64 nm and a thickness of 0.635 nm was alkali-cleaned and dried. Then, the substrate was put into a leaf type film forming apparatus (manufactured by the INTEVAC Company, mdp250B) having a plurality of individual film forming chambers. In this apparatus, a multi-layered film was formed for a tact time of 7.5 seconds. As a first underlayer 11 was used with a lamination of an Ni-20 at. % Cr-1 at. % Zr alloy layer having a thickness of 40 nm and a Co-30 at. % Cr-10 at. % Zr alloy layer having a thickness of 10 nm. After forming the first underlayer 11, the substrate was conveyed into a heating chamber in which it is heated up to 230° C. by a lamp heater and a mixed gas consisting of argon and an 1 vol % oxygen was introduced for 5.0 seconds so as to keep the heating chamber at a pressure of 1.4 Pa, for oxidizing the surface of the first underlayer 11. Afterwards, a layer of a Cr-20 at. % Ti-10 at. % Mo alloy was formed as a second underlayer 12 to have a thickness of 20 nm. A layer of a Co-40 at. % Ru alloy was formed as a third underlayer 13 to have a thickness of 5 nm. Then, a magnetic layer 14 was formed of a Co-22 at. % Cr-14 at. % Pt-4 at. % B alloy to have a thickness of 12 to 14 nm. Further, a protective layer 15 was formed to have a thickness of 4 nm. Next, the substrate 10 was taken out of the film forming apparatus. The protective layer 15 was coated with a lubricant agent having perfluoroalkyl-polyether as its main component so that a lubricant layer having a thickness of 2 nm was formed. The first underlayer 11, the second underlayer 12, the third underlayer 13, and the magnetic layer 14 are all formed in the atmosphere of an argon gas at a pressure of 0.9 Pa by means of the DC magnetron sputtering method. The protective layer 15 having C as its main component was formed at a gas pressure of 1.3 Pa by means of the DC magnetron sputtering method. The used charge gas is argon containing nitrogen. The thickness of the magnetic layer 14 was arranged so that the Br·tmag comes closer to 5 Tnm.

According to a second composition of the eighth embodiment, the second underlayer 12 was formed of the Cr-20 at. % Ti-10 at. % W alloy and the other layers were formed in the same condition as that of the first composition thereof when producing the recording medium.

As to Reference

Except that the second underlayer 12 was formed of the Cr-20 at. % Ti alloy, the recording medium of the comparison reference was produced in the same condition as the first composition thereof.

A layer composed of the Ni-20 at. % Cr-15 at. % Zr alloy and another layer composed of the Co-30 at. % Cr-10 at. % Zr alloy, both of which were used as the first underlayer 11 of this embodiment, were formed on the glass substrate 10 to have thicknesses of 40 nm and 10 nm. Then, the X-ray diffraction patterns of these layers were observed. In this measurement, the CuKα1 ray that was made monochromatic by a monochrometer was used for an X-ray source. No clear diffraction peak was found in the observed diffraction pattern and only a broad hollow pattern was found around 2θ=40 to 43°. Hence, it was understood from this fact that the first underlayer 11 of this embodiment was amorphous or had a microfine crystalline structure.

Figure 9:
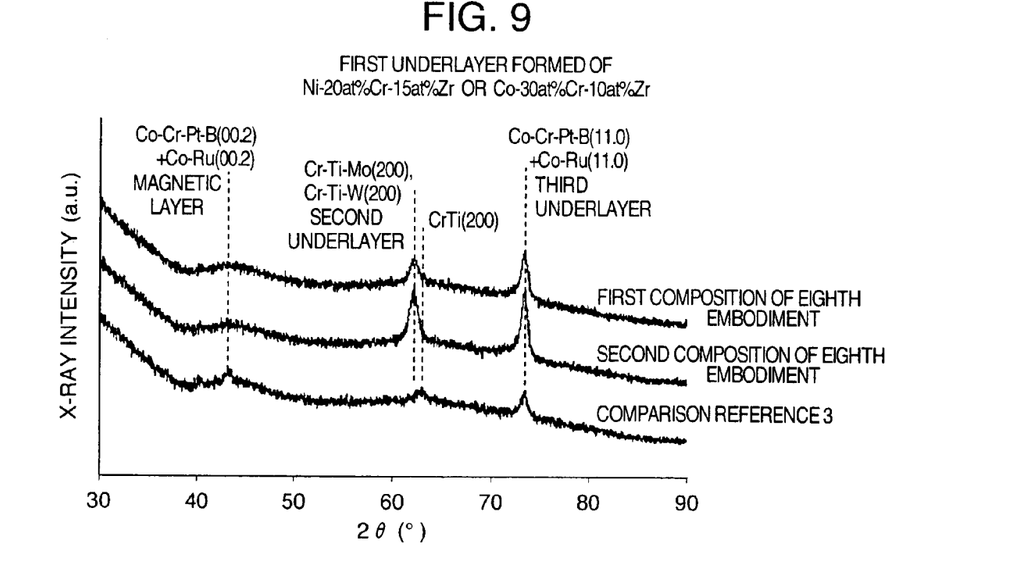
FIG. 9 is a graph showing X-ray diffraction patterns of the first underlayer and the second underlayer in an eighth embodiment of the invention and the comparison reference.

FIG. 9 shows the X-ray diffraction patterns of this embodiment. The diffraction patterns of the first and the second compositions of the eighth embodiment indicates a stronger diffraction of the (200) plane of the second underlayer 12 rather than the comparison reference and an improved orientation on the (200) plane. Further, it was assured that the diffraction peak of the (200) plane of the second underlayer 12 of this embodiment was shifted to a low angle side and the plane spacing on the (200) plane was made larger. Likewise, it was also assured that the diffraction peak of the (00.2) plane composed of the Co—Ru alloy layer and the Co—Cr—Pt—B alloy layer was decreased and the strong diffraction peak on the (11.0) plane took place. The resulting medium obtains a strong in-plane orientation. The orientation on the (11.0) plane was improved because of the fact that the use of the Cr—Ti—Mo alloy layer or the Cr—Ti—W alloy layer for the second underlayer 12 leads to improving the orientation on the (200) plane, the (11.0) plane of the Co—Ru alloy layer located on the (200) plane being subject to excellent epitaxial growth, and thereby the (11.0) plane obtains the (11.0) orientation of the magnetic layer 14. The medium produced in the same condition as that of the first composition of the eighth embodiment except that the third underlayer was formed of a Co-35 at. % Ru, Co-50 at. % Ru or Co-55 at. % Ru alloy indicates the similar result. On the other hand, about the medium produced in the same condition as the first composition of the eighth embodiment except that the third underlayer was formed of a Co-20 at. % Cr-40 at. % Ru alloy layer, it was not assured that this medium has so strong (11.0) orientation as described above.

Table 4 lists the electrostatic characteristics, the thermal stability factor Ku·V/kT, and the (200) plane spacing of the second underlayer 12 derived from the X-ray diffraction pattern of the medium of this embodiment.

TABLE 4

| Eight Embodiment | Second Underlayer | Hc (kA/m) | S* | Br · tmag (Tnm) | KV/kT | (200) In-plane Spacing |
|---|---|---|---|---|---|---|
| 1 | Co-20at % Ti-10at % Mo | 322 | 0.73 | 5.1 | 106 | 1.495 |
| 2 | Co-20at % Ti-10at % W | 348 | 0.84 | 4.9 | 123 | 1.496 |
| Comparison Reference | Co-20at % Ti | 272 | 0.53 | 4.8 | 92 | 1.477 |

The electrostatic characteristics were measured by applying a maximum magnetic field of 796 kA/m (10,000 oersted) through the use of a vibrating sample magnetometer. The thermal stability factor Ku·V/kT was derived by fitting the dependency of the residual coercivity Hcr on a time ranging from 7.5 to 240 seconds in a room temperature to the Sharrock expression. The lattice plane spacing was calculated from the Bragg condition.

In any composition of this embodiment, it was indicated that the coercivity was as high as 318 kA/m (4,000 oersted). Further, in comparison with the comparison reference, the medium of this embodiment improved the coercivity by 50 to 76 kA/m (628 to 955 oersted) and the coercivity squareness by 0.2 to 0.3. Further, in any composition of this embodiment, the thermal stability factor ku·V/kT is 100 or more, which means that the value is especially stable to the thermal fluctuation.

(Ninth Embodiment)

According to a first composition of the ninth embodiment, an alumino silicate based tempered glass substrate 10 having a diameter of 64 mm and a thickness of 0.635 mm was alkali-cleaned and dried and then put into a leaf type film forming apparatus (manufactured by INTEVAC Company, mdp250B) having a plurality of individual film forming chambers. In this apparatus, a multi-layered film was formed on the substrate for a tact time of 6.5 seconds. The first underlayer 11 was formed of a Co-30 at. % Cr-10 at. % Zr alloy to have a thickness of 30 nm. After forming the first underlayer 11, the substrate was conveyed into a heating chamber in which the substrate was heated up to 230° C. by means of a lamp heater and a mixed gas of argon and 1.0 vol % of oxygen was introduced for 4.0 seconds so that a pressure of 2.4 Pa was kept inside, for oxidizing the surface of the first underlayer 11. Afterwards, the second underlayer 12 was formed of a Cr-20 at. % Ti-10 at. % Mo alloy to have a thickness of 20 nm. The third underlayer 13 was formed of a Co-40 at. % Ru alloy to have a thickness of 5 nm. Then, the magnetic layer 14 was formed of a Co-20 at. % Cr-14 at. % Pt-6 at. % B to have a thickness of 13 to 15 nm. Then, the protective layer 15 was formed to have a thickness of 4 nm. Then, the substrate 10 was taken out of the film forming apparatus and a lubricant agent having perfluoroalkyl-polyether as its main component was coated on the protective layer 15 so that a lubricant layer of 2 nm was formed. The first underlayer 11, the second underlayer 12, the third underlayer 13, and the magnetic layer 14 were formed in an argon gas atmosphere at 0.9 Pa. For forming the protective layer 15 formed of carbon, a mixed gas of ethylene and argon was used as a charge gas at a gas pressure of 0.5 Pa. The formation is implemented by means of the CVD method. The thickness of the magnetic layer 14 was arranged so that the Br·tmag comes closer to 5 Tnm.

According to a second composition of the ninth embodiment, the recording medium was produced in the same condition as that of the first composition of the ninth embodiment except that the second underlayer 12 was formed of a Cr-20 at. % Ti-5 at. % Mo alloy.

According to a third composition of the ninth embodiment, the recording medium was produced in the same condition as that of the first composition of the ninth embodiment except that the second underlayer 12 was formed of a Cr-20 at. % Ti-5 at. % Mo-3 at. % B alloy.

According to a fourth composition of the ninth embodiment, the recording medium was produced in the same condition as that of the first composition of the ninth embodiment except that the second underlayer 12 was formed of a Cr-15 at. % Ti-5 at. % Mo-3 at. % B alloy.

As a comparison reference, the recording medium was produced in the same condition as that of the first composition of the ninth embodiment except that the second underlayer 12 was formed of a Cr-20 at. % Ti alloy.

When the X-ray diffraction patterns were observed, like the medium of the eighth embodiment, what was observed is only the (200) diffraction peak of the second underlayer 12 and the (11.0) diffraction peak of a mixture of the Co—Ru alloy underlayer (third underlayer) and the Co—Cr—Pt—B magnetic layer 14.

Table 5 lists the electrostatic characteristics, the thermal stability factor KuV/kT, a medium S/N ratio, and an output resolution of the recording medium according to the ninth embodiment.

Herein, the medium S/N ratio is defined as medium S/N=20 log (SMF/2/Nd)(dB) through the use of the read output SMF (mVpp) provided when the data is recorded at a linear recording density of 11.9 kFC/mm (302 kFCI). In the definition, Nd ($\mu$Vrms) is a medium noise provided when the data is recorded at a linear recording density of 23.8 kFC/mm (604 kFCI). The output resolution is defined as a value SMF/SLF×100 (%) through the use of the read output SMF and the isolated read wave output SLF (mVpp) provided. The medium S/N ratio was estimated by using a composite head having a recording head and a spin-valve type read head, the recording head having a track width of 0.5 $\mu$m and a gap length of 0.15 $\mu$m, and the spin-valve type read head having a track width of 0.35 $\mu$m and a gap length of 0.1 $\mu$m. The magnetic spacing was arranged as 23 nm. The other values were measured by the same method as that of the eighth embodiment.

The medium of this embodiment offers a better coercivity and coercivity squareness than the comparison reference. The coercivity was as large as 13 to 51 kA/m (163 to 641 oersted) and the coercivity squareness was as large as 0.1 to 0.2 than the comparison reference. In any medium of this embodiment, ku·V/kT is 100 or more, which indicates the very excellent thermal stability. In all the embodiments, the S/N ratio is larger than that of the comparison reference and the output resolution is larger by 3 to 5 points than that of the comparison reference. It is noted that the medium S/N in this embodiment is lightly lower than that described in the first, second, fourth and fifth embodiments. This is because a tester and spin-stand used in the estimation are different.

It goes without saying that the magnetic recording medium described with respect to the eighth and the ninth embodiments may be mounted on the magnetic recording apparatus described with respect to the seventh embodiment, realizing a magnetic recording apparatus capable of recording and reproducing information on the medium having 35 megabits or more per square millimeter as a longitudinal recording density.

What is claimed is:

1. A longitudinal magnetic recording medium comprising,
a non-magnetic substrate;
a first underlayer having an amorphous structure, formed on said non-magnetic substrate;
a second underlayer having a body-centered cubic structure formed on said first underlayer;
a third underlayer having a hexagonal closed packed structure formed on said second underlayer; and
a magnetic layer having the hexagonal closed packed structure formed on said third underlayer, a crystal grain constituting said magnetic layer having an orientation in which a (11.0) plane is oriented substantially in parallel with the plane of said substrate, wherein
said third underlayer is composed of a Co-Ru alloy than does not contain Cr.

TABLE 5

| Tenth Embodiment | Second Underlayer | Hc (kA/m) | S* | Br · tmag (Tnm) | KV/kT | Media S/N (dB) | Output Resolution (%) |
|---|---|---|---|---|---|---|---|
| 1 | Co-20at % Ti-10at % Mo | 343 | 0.74 | 4.9 | 104 | 17.1 | 58.3 |
| 2 | Co-20at % Ti-5at % Mo | 328 | 0.73 | 4.9 | 103 | 17.7 | 60.3 |
| 3 | Co-20at % Ti-5at % Mo-3at % B | 333 | 0.72 | 4.7 | 114 | 17.2 | 59.3 |
| 4 | Co-15at % Ti-5at % Mo-3at % B | 305 | 0.65 | 5.0 | 102 | 17.9 | 60.7 |
| Comparison Reference | Co-20at % Ti | 291 | 0.52 | 4.8 | 94 | 16.5 | 54.9 |

2. A longitudinal magnetic recording medium comprising,
a non-magnetic substrate;
a first underlayer having an amorphous structure, formed on said non-magnetic substrate;
a second underlayer having a body-centered cubic structure formed on said first underlayer;
a third underlayer having a hexagonal closed packed structure formed on said second underlayer; and
a magnetic layer having the hexagonal closed packed structure formed on said third underlayer, a crystal grain constituting said magnetic layer has an orientation in which a (11.0) plane is oriented substantially in parallel with the plane of said substrate, wherein
said third underlayer is composed of a Co-Rn alloy containing 35 at. % to 60 at. % Ru, but not containing Cr.

3. A longitudinal magnetic recording medium according to claim 1, wherein said first underlayer contains at least one element of 30 at. % to 60 at. % selected from the group consisting of Cr, V and Mn; at least one element of 3 at % to 30 at % selected from the group consisting of zr, Hf, Ta, Nb, Ti, W, Mo, B and Si; and a rest of component of said first underlayer is Co.

4. A longitudinal magnetic recording medium according to claim 1, wherein said first underlayer is an amorphous alloy, containing at least one element of 0 at. % to 50 at. % selected from the group consisting of Cr, V and Mn; at least one element of 3 at. % to 60 at. % selected from the group consisting of Zr, Ta, Ti, W, Mo, B and Si; and a rest of component of said first underlayer is Ni.

5. A longitudinal magnetic recording medium according to claim 2, wherein said first underlayer contains at least one element of 30 at. % to 60 at. % selected from the group consisting of Cr, V and Mn; at least one element of 3 at. % to 30 at. % selected from the group consisting of Zr, Hf, Ta, Nb, Ti, W, Mo, B and Si; and a rest of component of said first underlayer is Co.

6. A longitudinal magnetic recording medium according to claim 2, wherein said first underlayer is an amorphous alloy, containing at least one element of 0 at. % to 50 at. % selected from the group consisting of Cr, V and Mn; at least one element of 3 at. % to 60 at. % selected from the group consisting of Zr, Ta, Ti, W, Mo, B and Si; and a rest of component of said first underlayer is Ni.

* * * * *